July 18, 1961     O. A. MILLER     2,992,487

MEASURING RULE

Filed Aug. 16, 1957

INVENTOR.
OWEN A. MILLER

BY

HIS ATTORNEYS

United States Patent Office 2,992,487
Patented July 18, 1961

2,992,487
MEASURING RULE
Owen A. Miller, Fairborn, Ohio
(1503 W. Main St., Springfield, Ohio)
Filed Aug. 16, 1957, Ser. No. 678,499
1 Claim. (Cl. 33—138)

This invention relates to measuring rules and more particularly to improvements in housings for flexible steel measuring tapes, although not necessarily so limited.

Self-retracting flexible steel tape measuring devices, wherein the tape is stored in a reel inside a housing, frequently have the characteristic that the last several inches of tape do not retract into the housing, but must be pushed manually into the housing. This manual pushing causes the tape to slide erratically into the housing thereby producing execssive frictional wear on the end portion of the measuring tape. Since the end portion of the tape is also that portion which is used the most, frictional wear in this portion of the measuring tape is most pronounced and most objectionable in that the indicia or graduations become illegible.

An object of the present invention is to provide antifriction means for guiding the flexible measuring tape into and out of the housing so as to minimize frictional wear and binding of the tape within the housing.

Another object of this invention is to provide a continuous guiding surface within the real housing for guiding the flexible tape onto the reel.

A further object of this invention is to provide a housing for flexible measuring tape which also houses an illuminating source adapted to illuminate the indicia of the measuring tape when the tape is withdrawn from the housing.

Other objects and advantages reside in the construction of parts, the combination thereof, the method of manufacture, and the mode of operation, as will become more apparent from the following description.

Figure 1:
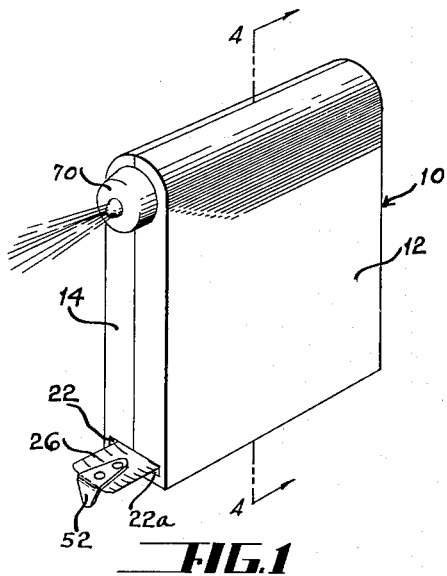
FIGURE 1 is a perspective view of the measuring rule.

Referring to the drawing in greater detail, the housing 10 for the measuring rule comprises two mating body members 12 and 14. These body members are cut or molded from a suitable stock such as steel, aluminum, or a plastic, or the like.

Figure 3:
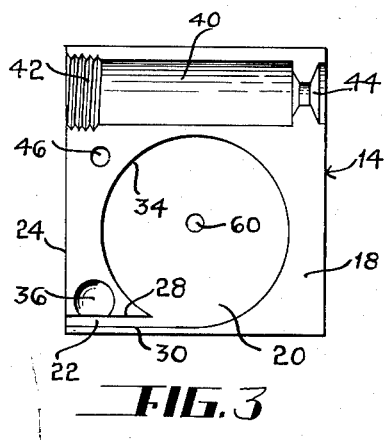
FIGURE 3 is a plan view of the portion of the housing which was removed from the rule in FIGURE 2.
Figure 4:
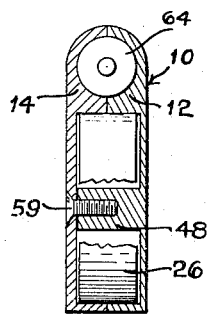
FIGURE 4 is a section view taken substantially along the line 4—4 of FIGURE 1.

The body members 12 and 14 are provided with opposing mating faces 16 and 18, respectively, which are substantially rectangular in shape. As illustrated in FIGURE 3, the body member 14, which serves as a cover plate, is provided with a cylindrical recess 20 located in the face 18 thereof and a channel portion 22 communicating tangentially with the recess 20 and extending to one margin 24 of the body member 14. As will be described subsequently, the recess 20 is adapted to receive a reel of flexible steel measuring tape 26 and the channel portion 22 provides an outlet for the free end of the tape 26.

The channel portion 22 is bounded by walls 28 and 30, the wall 30 forming a continuous surface with the wall 34 of the cylindrical recess 20. A semispherical recess 36 located in spaced relation to the margin 24 of the body member 14 in the face thereof intersects the wall 28 of the channel portion 22. This recess 36 is adapted to receive a ball bearing 38 which projects partially into the channel portion 22 as will be described subsequently.

The body member 14 is also provided with a substantially semicylindrical recess 40 extending across the face 18 thereof. At one end of this recess 40 is a threaded wall portion 42, and adjacent the opposite end of the recess 40 is a semiannular constriction or wall 44 having tapered sides. The semicyclindrical recess 40 provides a receptacle for a flashlight assembly as will be described subsequently.

The body member 14 is also provided with a small hole or aperture 46 which, as will be described subsequently, is utilized in registering the two body members 12 and 14 when assembling the housing 10.

Figure 2:
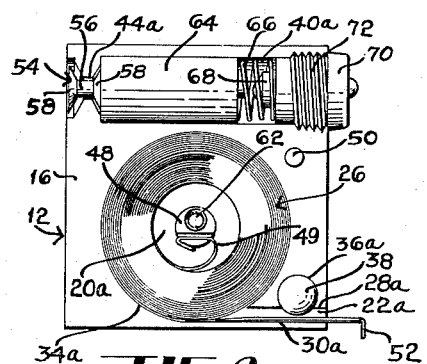
FIGURE 2 is a plan view of the rule of FIGURE 1 with half the housing removed.

The body member 12 illustrated in FIGURE 2 is constructed in the mirror image of the body member 14. Thus the body member 12 has a cylindrical recess or cavity 20a, a tangentially extending channel portion 22a, a semispherical recess 36a intersecting the wall 28a of the channel 22a, and a substantially semicylindrical recess 40a providing a receptacle for a flashlight assembly. The body member 12 is provided additionally with a bifurcated post 48 extending axially in the cylindrical recess 20a thereof.

The post 48 serves as an anchoring point for the inner end 49 of the measuring tape 26 which is seated within the cylindrical recess 20a. As is conventional in measuring devices of this type, the inner end 49 of the tape 26 is a resilient spring which functions to retract the steel tape into the housing. The body portion 12 is further provided with a small post 50 adapted to seat in the aperture 46 of the body member 14 as a means of registering the body members when they are positioned side by side in opposing relation.

In assembling this measuring device, the tape 26 is placed in the cylindrical cavity 20a. The inner end 49 of the tape 26 is anchored to the post 48, as shown in FIGURE 2. The outer end of the tape 26, which is provided with an abutment portion 52, is permitted to project out to the side of the body member 12 through the channel portion 22a thereof. The ball bearing 38 is seated in the semicylindrical recess 36a of the body member 12. A plunger element 54 is seated on the constricting wall portion 44a in the semicylindrical recess 40a. This plunger element 54 comprises a cylindrical central portion 56 and conical flared portions 58 at each end of the cylindrical portion. The taper of the conical flared portions 58 is substantially complementary to the taper of the sides of the wall portion 44.

The body member 14 which serves as a cover plate is then positioned upon the body member 12 with the faces 16 and 18 of the body members 12 and 14, respectively, in opposing relation. The post 50 seats within the aperture 46, so as to register the body members one with respect to the other. A threaded screw element 59 is then passed through an aperture 60 in the body member 14 to threadedly engage an internally threaded aperture 62 in the post 48 of the body member 12 to secure the body members together.

When the body members have thus been secured together to form the housing 10, the semicylindrical recesses 40 and 40a in the body members 12 and 14 cooperate to provide a cylindrical cavity in the housing 10 having an internally threaded wall portion at one end thereof. This cavity is adapted to receive successively a battery 64, a coil spring 66, a flashlight lamp 68, and a lens member 70 having an externally threaded portion 72 adapted to engage the threaded wall portion of the cavity. The arrangement of this flashlight assembly is such that the coil spring 66 normally breaks contact between the battery 64 and the lamp 68, and the plunger element 54 may be manually depressed to override the spring 66, so as to make contact between the lamp and the battery. Where the housing 10 is of metallic construction, the electrical circuit for operating the flashlight is completed through the housing. Where the housing 10 is of plastic construction, a metallic strap may be inserted in the cylindrical cavity which forms the receptacle for the flashlight assembly, so as to make electrical contact from the plunger element 54 to the lamp 68.

Figure 5:
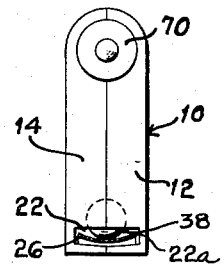
FIGURE 5 is an end elevational view of the rule of FIGURE 1 drawn to a slightly reduced scale.

As clearly shown in FIGURE 5, the ball bearing 38 projects partially into the outlet channel formed by the channel portions 22 and 22a of the body members 12 and 14. The ball bearing 38 thus serves to constrict this outlet and to provide a freely rotating bearing surface for one side of the tape 26. Preferably, although not necessarily, the tape 26 is of the concavo-convex type wherein the tape indicia are placed on the concave surface of the tape. The indicia extending along the margins do not come in contact with the ball bearing 38, thereby protecting the indicia. Further, the tape is preferably reeled into the housing with the concave side thereof facing the inside of the reel. With this construction the ball bearing 38 functions to protect the concave side of the tape from abrasive frictional wear.

In this respect, it is to be noted that the walls 30 and 30a of the channel portions 22 and 22a and the walls 34 and 34a of the cylindrical recesses 20 and 20a cooperate to provide a continuous surface for guiding the tape 26 into the housing 10. The ball bearing 38 functions to direct the tape into engagement with this surface. Such construction serves to minimize abrasion and binding of the tape 26 as the last few inches thereof are pushed manually into the housing 10. It is to be further noted that the recesses 36 and 36a which house the ball bearing 38, while illustrated and described as semicylindrical recesses, may take other shapes, as for example, a conical shape, the only requirement being that the ball bearing 38 is rotatably supported adjacent the outlet channel of the housing 10.

The flashlight assembly is provided in the housing 10 for illuminating the indicia of the tape 26. Accordingly, the flashlight is shown as directing a beam substantially parallel to the direction in which the tape 26 is withdrawn from the housing 10. The indicia may then be conveniently illuminated by tilting the housing 10 slightly with respect to the line defined by the tape 26. It is to be understood, however, that the flashlight may be oriented within the housing 10, in the construction of this device, so as to direct the beam in any desired direction relative to the path taken by the tape 26.

It is to be further understood that the housing 10 may take any desired shape, including the substantially rectangular shape illustrated, without departing from the substance of this invention.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claim.

Having thus described my invention I claim:

A housing for a coil of flexible steel measuring tape and for a flashlight assembly for illuminating the indicia of the tape, said housing having a first substantially cylindrical cavity for receiving the coil of the tape, means providing an outlet channel in said housing connecting substantially tangentially with said cavity, the circumferential wall of said cavity and one wall of said outlet channel cooperating to provide a continuous guiding surface for said measuring tape, said housing having a second cavity for receiving a ball bearing, said second cavity communicating with said outlet channel, said housing including a ball bearing mounted within said second cavity and projecting partially into said outlet channel adjacent the outer end thereof, and means providing a third substantially cylindrical cavity in the housing for receiving the flashlight assembly, said third cavity having an axis parallel to said outlet channel whereby the flashlight assembly when mounted in this cavity will project a light beam parallel to the course of tape withdrawn from the housing.

References Cited in the file of this patent

UNITED STATES PATENTS

| 2,230,668 | Ohrtmann | Feb. 4, 1941 |
| 2,354,853 | Dobbs | Aug. 1, 1944 |
| 2,692,437 | Cook | Oct. 26, 1954 |

OTHER REFERENCES

"Flash-Rule Combination Has Many Uses," Scientific American, July, 1942, pp. 34 and 35. (Copy in Division 62.)

Popular Mechanics, January 1949, page 252 "Ruler Has Built-In Flashlight." (Copy in Division 66.)